UNITED STATES PATENT OFFICE 2,539,470

TREATMENT OF TOMATOES

Dean Earl Pryor, Whittier, Calif., assignor to Wallace & Tiernan Products Corporation, Belleville, N. J., a corporation of New Jersey No Drawing. Application December 26, 1947, Serial No. 794,083

11 Claims. (Cl. 99—154)

This invention relates to the treatment of raw tomatoes for the prevention of decay during shipment and storage and provides improvements to this end. More specifically, the invention provides for improved treatment employing chlorine and nitrogen trichloride under conditions hereinafter set forth.

In my co-pending application, Serial No. 735,249, now Patent No. 2,522,535, filed March 17, 1947, and entitled Treatment of Vegetables, I disclosed and claimed a process for the treatment of fruits and vegetables with an acid aqueous chlorine solution under controlled conditions. As illustrated in the aforementioned application, this process of treatment is superior to conventional treatment in a strong aqueous hypochlorite solution of basic character. The process of said application consists in general of washing the produce in an acid aqueous solution of free chlorine having a chlorine concentration ranging from about 25 to about 250 parts per million and having a hydrogen ion concentration of from about pH 4.0 to about pH 6.0. In this process the control of the pH, within the range indicated, is an important factor in securing optimum results.

I have now found that the elimination of infectious organisms on the surface of raw tomatoes can be brought about with greater effectiveness by a combination treatment using chlorine and nitrogen trichloride. In the first step of the process according to the present invention, the tomatoes are washed in an aqueous solution containing free chlorine and in the second step the washed tomatoes are exposed to an atmosphere of NCl₃. The effects of this dual treatment are in the majority of cases synergistic; that is the effectiveness of the treatment is greater than that which might be predicted from a knowledge of the effects of the two agents individually. The reason for this synergistic effect is not clearly understood, but it appears that the initial wash in the chlorine solution acts in some way on the surface of the tomatoes to condition them favorably towards the action of the nitrogen trichloride. This feature of the invention will be apparent from the specific example hereinafter set forth.

The first step of the treating process, involving the washing of the tomatoes in an aqueous solution of chlorine, is preferably carried out as set forth in my aforementioned co-pending application. The tomatoes are washed for from about 1 to about 10 minutes in an aqueous solution containing from about 25 to about 250 parts per million of chlorine and having a hydrogen ion concentration ranging from about pH 4.0 to about pH 6.0.

During the washing treatment, the chlorine concentration and the pH preferably are maintained within the foregoing limits by circulation of the treating solution and with continuous addition of chlorine. In many cases the plant refuse or dirt which accompanies the tomatoes to the washing process may serve to buffer the solution sufficiently to maintain the preferred hydrogen ion concentration. In other cases however, a buffer such as calcium carbonate or an alkali such as sodium hydroxide must be added for hydrogen ion control, and in rare instances, as for example, when tomatoes are grown in very alkaline soil and carry considerable earth to the washing pit, and when the wash water is naturally buffered or alkaline, it may be necessary to add an acid agent to maintain the pH in the range set forth.

Although the first step of the present process may be carried out in conformity with the process set forth in the above identified co-pending application, as described in the preceding paragraph, I have found that it need not be done in this manner, in order to make the subsequent nitrogen trichloride treatment effective. Thus aqueous chlorine solutions with hydrogen ion concentrations outside the range of pH 4 to pH 6 may be employed in the present dual treatment. Aqueous solutions of hypochlorite may be employed at pH's in excess of 7—say up to 10.

The average treatment time for the first step of the process should range from about 1 to about 10 minutes and the solution temperature should be tap temperature or lower, i. e. 25° C. or less. This is in marked contrast to many fruit washing processes, such for example, as the washing with a borax solution or with an alkaline hypochlorite solution, which require higher temperatures to be effective. The washing solution may be heated to a temperature in the range of about 90° F. to about 130° F. to obtain improved cleaning if necessary. However, the temperature of the wash solution is preferably held below 100° F. to minimize danger of injury to the tomatoes. In the process of the invention, low temperatures are desirable not only because they are obtained more cheaply than high temperatures, but also because low temperatures reduce the opportunity for development of deep seated infections.

Although not essential to carrying on the initial washing step, wetting agents may be employed to decrease the surface tension of the solution and thus increase the contact area of the fruit. For example, it may be desirable to employ anionic wetting agents in concentrations in the neighborhood of .1% or less, i. e. in concentrations that are not toxic and that do not form toxic films on the product. Sulfonated kerosene and similar substances are preferred agents.

The washing step of the invention can be carried out in customary washing equipment, for example, in the conveyer-equipped systems normally employed in large scale washing of a variety of fruits and vegetables. The treatment is rapid and can be carried on simultaneously with the removal of solids and waste products. The present process, being applicable particularly to tomatoes, may employ the typical washing apparatus wherein the tomatoes are carried on a conveyer which dips in and out of the washing tank. The tank should be equipped with a pump or the like to maintain circulation of the treating solution, chlorine being added in such amounts as to maintain proper concentration and other agents being added in such amounts as required to maintain the proper pH.

After the tomatoes are washed in the aqueous chlorine solution they are drained and preferably permitted to dry. They are then subjected to the second step of the operation wherein they are contacted with an atmosphere of nitrogen trichloride and air, the nitrogen trichloride being maintained at relatively low concentration. This gassing step may be conducted in any closed chamber which permits adequate contact of the $NCl_3$ with the surfaces of the tomatoes. It is desirable to carry on the gassing process in enclosed chambers or rooms particularly constructed for the purpose, but in many cases crated tomatoes may be exposed to the nitrogen trichloride containing atmosphere after loading a refrigerating car.

Nitrogen trichloride gas is added to the air to obtain concentrations of as small as .01 to 1 part per million. In many instances an upper limit of approximately 0.2 part per million is preferable. The gas at this concentration, which is safely below explosive limits, is circulated through the treatment space in which the tomatoes are placed on racks or in crates. Exposure to the nitrogen trichloride should be carried on from a minimum of 2 to 3 hours to a maximum of 6 hours. The treatment may be at room temperature or below, best results being obtained at approximately room temperature.

The following example serves to show the synergistic effects of the dual treatment. In this test 20 tomatoes were artificially infected with a species of Rhizopus by firsts and papering a portion of each tomato and then dipping the whole tomato in a spore suspension.

This procedure was employed with four groups of 20 tomatoes in each group. The four groups of tomatoes were treated as follows:

The first group of 20 tomatoes was stored under normal conditions without any disinfecting treatment. The second group of tomatoes was washed in an acid aqueous solution containing 50 parts per million of chlorine for a period of about 5 minutes while maintaining the pH of the solution at about 5. The third group of tomatoes was exposed to an atmosphere containing about 0.1 part per million of nitrogen trichloride for a period of 3 hours. The fourth group of tomatoes was first washed in an aqueous solution having a pH of 5 and containing 50 parts per million of chlorine. After washing, this group of tomatoes was dried and subjected to an atmosphere containing 0.1 part per million of nitrogen trichloride for a period of three hours. The results of each of these treatments are shown in the following table.

*Table*

| Group No.[1] | Treatment | No. Decaying After Treatment |
|---|---|---|
| 1 | none | 20 |
| 2 | washed in solution containing 50 P. P. M. of Cl. | 18 |
| 3 | exposed to atmosphere containing 0.1 P. P. M. $NCl_3$ for 3 hrs. | 13 |
| 4 | washed in solution containing 50 P. P. M. Cl exposed to atmosphere 0.1 P. P. M. $NCl_3$ for 3 hrs. | 5 |

[1] 20 tomatoes per group.

By examination of the decay occurring in the first three groups of tomatoes it might be predicted that the dual treatment of group 4 would yield a total of 11 fruit decayed instead of 5. This hypothetical figure of 11 is arrived at by adding the effects of the washing and of the exposure to nitrogen trichloride as appearing in the decay figures of groups 2 and 3. Thus, it is apparent that the combined washing and nitrogen trichloride exposure to which the tomatoes of group 4 were subjected gives results which are considerably better than those predictable from the treatments taken separately. Although in some cases the synergistic effects may not be so marked as those illustrated in the table, the dual process shows results in every case which are better than those obtainable by either of the individual steps of the process and in the great majority of the cases results which are better than those predictable from the effects of the two steps viewed individually.

I claim:

1. In the treatment of tomatoes, the improvement which comprises washing the surfaces thereof in an aqueous acid solution containing available chlorine present in the solution substantially in the form of hypochlorous acid, draining the excess solution from the washed tomatoes and subjecting the drained tomatoes to an atmosphere containing from about .01 to about 1 part per million of nitrogen trichloride.

2. In the treatment of tomatoes, the improvement which comprises washing the surfaces thereof in an aqueous acid solution having its pH maintained in the range of about 4 to 6 and its chlorine concentration maintained in the range of about 25 to about 250 parts per million, draining the washed tomatoes, and exposing the drained tomatoes to an atmosphere containing about .01 to about 1 part per million of nitrogen trichloride for a period from about 2 to about 6 hours.

3. In the treatment of raw tomatoes, the improvement which comprises washing the surfaces thereof in a circulating aqueous acid solution containing from about 25 to about 250 parts per million of chlorine, maintaining this concentration of chlorine in the wash solution by the continuous addition of gaseous chlorine thereto, draining the washed tomatoes, and exposing the drained tomatoes to an atmosphere containing about .01 to about 1 part per million of nitrogen trichloride for a period of from about 2 to about 6 hours.

4. In the treatment of raw tomatoes, the improvement which comprises washing the surfaces thereof in a circulating aqueous acid solution containing from about 25 to about 250 parts per million of chlorine, maintaining this concentration of chlorine in the wash solution by the continuous addition of gaseous chlorine thereto, draining the washed tomatoes, drying the drained tomatoes, and exposing the dried tomatoes to an atmosphere containing from about .01 to about 1 part per million of nitrogen trichloride for a period of from about 2 to about 6 hours.

5. In the treatment of raw tomatoes, the improvement which comprises washing the surfaces thereof for from 1 to 10 minutes in a circulating aqueous acid solution having a pH in the range of about 4 to 6 and a chlorine concentration in the range of about 25 to about 250 parts per million and drying the washed tomatoes, and exposing the dried tomatoes to an atmosphere containing from about .01 to about 1 part per million of nitrogen trichloride for a period of about 2 to about 6 hours.

6. A tomato treating process which comprises washing the tomatoes in an aqueous acid solution containing available chlorine present in the solution substantially in the form of hypochlorous acid, draining the excess solution from the washed tomatoes, and exposing the drained tomatoes to an atmosphere containing nitrogen trichloride.

7. In the treatment of tomatoes, the improvement which comprises washing the surfaces thereof in an aqueous acid solution containing from about 25 to about 250 parts per million of available chlorine present in the solution substantially in the form of hypochlorous acid, draining the excess solution from the washed tomatoes and subjecting the drained tomatoes to an atmosphere containing nitrogen trichloride.

8. In the treatment of tomatoes, the improvement which comprises washing the surfaces thereof in an aqueous solution containing chlorine and having its pH maintained in the range of about 4 to 6, the chlorine being present in the solution substantially in the form of hypochlorous acid, draining the washed tomatoes, and exposing the drained tomatoes to an atmosphere containing nitrogen trichloride.

9. In the treatment of tomatoes, the improvement which comprises washing the surfaces thereof in an aqueous solution containing from about 25 to 250 parts per million of chlorine, and maintained at a pH in the range of about 4 to 6, the chlorine being present in the solution substantially in the form of hypochlorous acid, draining the washed tomatoes, and exposing the tomatoes to an atmosphere containing nitrogen trichloride.

10. In the treatment of tomatoes, the improvement which comprises washing the surfaces thereof for from about 1 to 10 minutes in a circulating aqueous acid solution containing from about 25 to about 250 parts per million of chlorine, the chlorine being present in the solution substantially in the form of hypochlorous acid, draining the washed tomatoes and exposing the drained tomatoes for from about 2 to about 6 hours to an atmosphere containing nitrogen trichloride.

11. In the treatment of tomatoes, the improvement which comprises washing the surfaces thereof in a circulating aqueous acid solution containing from about 25 to about 250 parts per million of chlorine, maintaining the concentration of chlorine in the solution by the continuous addition of gaseous chlorine to the solution, drying the washed tomatoes, and exposing the dried tomatoes for at least about 2 hours to an atmosphere of nitrogen trichloride.

DEAN EARL PRYOR.

REFERENCES CITED

The following references are of record in the file of this patent:

UNITED STATES PATENTS

| Number | Name | Date |
|---|---|---|
| 1,378,644 | Baker | May 17, 1921 |
| 1,842,696 | Slater | Jan. 26, 1932 |
| 1,967,074 | Baker | July 17, 1934 |
| 2,126,958 | Guha | Aug. 16, 1938 |

OTHER REFERENCES

McCulloch: "Disinfection and Sterilization," page 338. Lea & Febiger, Phila., August 1946.